(12) United States Patent
Yutani et al.

(10) Patent No.: US 6,591,683 B1
(45) Date of Patent: Jul. 15, 2003

(54) PRESSURE SENSOR

(75) Inventors: Naoki Yutani, Tokyo (JP); Hiroshi Ohji, Tokyo (JP); Kazuhiko Tsutsumi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/203,453
(22) PCT Filed: Jul. 13, 2000
(86) PCT No.: PCT/JP00/04679
§ 371 (c)(1), (2), (4) Date: Aug. 9, 2002
(87) PCT Pub. No.: WO02/06786
PCT Pub. Date: Jan. 24, 2002

(51) Int. Cl.⁷ ............................ G01L 19/04; H01B 17/28
(52) U.S. Cl. ........................................ 73/708; 374/143
(58) Field of Search .................. 73/706, 708, 715–728; 338/2, 4, 42; 361/283.1–283.21; 374/137, 143, 163, 178, 179

(56) References Cited

U.S. PATENT DOCUMENTS

| | | |
|---|---|---|
| 4,320,664 A | 3/1982 | Rehn et al. |
| 4,682,503 A | 7/1987 | Higashi et al. |
| 5,187,674 A | 2/1993 | Bonne |
| 6,393,919 B1 | 5/2002 | Ohji et al. |

FOREIGN PATENT DOCUMENTS

| | | |
|---|---|---|
| JP | 58-72059 | 4/1983 |
| JP | 60-56233 | 4/1985 |
| JP | 61-137242 | 8/1986 |
| JP | 5-10840 | 1/1993 |
| JP | 6-241933 | 9/1994 |
| JP | 8-184514 | 7/1996 |
| WO | WO00/39551 | 7/2000 |

Primary Examiner—William Oen
(74) Attorney, Agent, or Firm—Leydig, Voit & Mayer, Ltd.

(57) ABSTRACT

A pressure sensor includes a diaphragm having a first surface receiving pressure, and a first thermal detection section opposed to a central section of the diaphragm through a spacer and having a thermo-sensitive resistance section, and a second thermal detection section opposed to an end section of the diaphragm and having a thermo-sensitive resistance section, wherein the first thermo-sensitive resistance section and second thermo-sensitive resistance section are connected to independent, adjustable constant-current sources, respectively, and are connected to a differential amplifier which amplifies a difference between (i) a voltage of the first thermal detection section, which detects a displacement quantity of the diaphragm due to pressure change as a displacement quantity of a thermal equilibrium state by the thermal detection section, and (ii) a voltage of the second thermal detection section, which does not change according to pressure. The sensor can measure pressure with high accuracy.

3 Claims, 5 Drawing Sheets

PRESSURE SENSOR

TECHNICAL FIELD

This invention relates to a pressure sensor which measures pressure. More particularly, this invention relates to a pressure sensor which measures calories deprived from a heating element included in a thermal pressure detector or a section heated by the heating element by a diaphragm which is arranged to be opposite to and spaced from the heating element or the heated section by a fixed distance, by using the thermal pressure detector.

BACKGROUND ART

A pressure sensor which measures the flexible quantity of a diaphragm using an almost univocal functional relationship held between the pressure of a measurement target fluid and the flexible quantity of the diaphragm on a cylinder which diaphragm receives pressure from the measurement target fluid and using a distortion gauge which is formed on the diaphragm by a film formation technique, a photo-engraving technique or the like, and which sensor thereby obtains the pressure of the fluid proportional to the flexible quantity of the diaphragm, is widely utilized for the detection of the quantity of the intake air of an internal combustion engine, that of the oil pressure of a vehicle brake or the like.

FIG. 5 is a cross-sectional view of a conventional pressure sensor which is disclosed by, for example, Japanese Utility Model Application Laid-Open No. S61-137242 (microfilm of Japanese Utility Model Application No. S60-19572).

In FIG. 5, a reference symbol 101 denotes a metallic cylinder, 102 denotes a semiconductor monocrystalline plate which is provided. with a distortion gauge 103 and the semiconductor monocrystalline plate consists of, for example, a silicon substrate. For the pressure sensor in which the semiconductor monocrystalline plate 102 is bonded to the metallic cylinder 101 shown in FIG. 5, the metallic cylinder 101 and the semiconductor monocrystalline plate 102 differ in material and a distortion, therefore, tends to occur to the semiconductor monocrystalline plate 102 which constitutes a diaphragm due to the difference in the coefficient of linear expansion between the cylinder 101 and the plate 102 at a time when temperature change. This causes a measurement error. In addition, since the pressure of a measurement target fluid is directly applied to the semiconductor monocrystalline plate 102, it is necessary to secure sufficiently high bonding strength between the metallic cylinder 101 and the semiconductor monocrystalline plate 102.

In FIG. 6, a reference symbol 104 denotes a metallic cylinder which consists of a cut-off pipe such as a stainless pipe. A metallic thin film 105 which is welded to the cylinder 104 is formed out of a thin plate of a rolled material and it has a uniform film thickness and a flat surface because of the rolled material. The material of the metallic thin film 105 is the same as that of the cylinder 104. In addition, a silicon oxide thin film 106 which functions as an insulating film, is formed on the upper surface of the metallic thin film 105. A plasma CVD method is used to form the silicon oxide thin film 106. A silicon thin film which constitutes a distortion gauge 107 is then formed on the silicon oxide thin film by the plasma CVD method. This silicon thin film is etched to partially leave the silicon thin film and remove the other sections as shown in FIG. 6, and the distortion gauge 107 is formed out of the silicon thin film which is thus left. Furthermore, metal such as gold is deposited on the distortion gauge 107 to thereby form an electrode. A lead wire is bonded to this electrode by ultrasonic bonding. The electrode and the lead wire are appropriately connected to each other, whereby a circuit can be formed.

Each of the conventional pressure sensors shown in FIGS. 5 and 6 uses the distortion gauge. The diaphragm is distorted by the pressure of the measurement target fluid applied to the diaphragm and each of these pressure sensors measures the, distortion by the distortion gauge provided on the diaphragm. Besides these pressure sensors, a pressure sensor which detects the flexure of a diaphragm as a capacitance change is also used.

FIG. 7(a) is a cross-sectional view and FIG. 7(b) and FIG. 7(c) are top views of a conventional pressure sensor of a capacitance detection type disclosed in, for example, Japanese Patent Application Laid-Open No. S60-56233.

In FIG. 7(a), reference symbol 108 denotes a substrate which has an electrode 109 provided in the central portion of an upper surface thereof, an electrode 110 for correction concentric to the both and provided on an edge section thereof and a hole 111 provided in between the electrode 109 and the correction electrode 110. Reference symbol 112 denotes a diaphragm on one surface of which an electrode 113 is provided at a position opposite to the electrode 109. Reference symbol 114 denotes gap adjustment glass beads which are interposed between the substrate 108 and the diaphragm 112 so as to form a gap 115 between the electrodes 109 and 113. In this pressure sensor, when pressure P is applied to the diaphragm 112, the gap 115 in the central section becomes smaller and static capacitance increases between the electrodes 109 and 113. The pressure sensor is intended to measure the pressure using an almost univocal functional relationship held between this capacitance change and the pressure of a measurement target fluid.

According to the conventional pressure sensor which is constituted as explained above, when the distortion gauge formed on the silicon substrate is used, it is impossible to secure sufficient bonding strength between the cylinder and the silicon substrate on which the distortion gauge is formed. It is, therefore, impossible to directly apply the pressure of the measurement target fluid to the silicon substrate and to measure the pressure of the measurement target fluid. Accordingly, it is required to cause pressure to be acted on a buffer in a different chamber using the diaphragm which is deformed by the measurement target fluid and to measure the pressure of the buffer using the distortion gauge provided on the silicon substrate.

Further, when the distortion gauge of the silicon thin film provided on the metallic diaphragm is used, it is not easy to directly manufacture silicon thin film distortion gauges on the metallic diaphragmwhich receives the pressure in block in large quantities. This is because an apparatus for the silicon substrate (for silicon process) cannot be used as a diversion.

Moreover, according to the capacitance detection type pressure sensor, it is necessary to form an insulating layer on the metallic diaphragm and to then form a capacitance detection electrode using the photo-engraving technique or the like. As can be seen, when the metallic diaphragm is used, it is conventionally necessary to subject the metallic diaphragm to film formation processing, photo-engraving processing and the like. However, a film formation apparatus and a photo-engraving apparatus conventionally used for a silicon substrate cannot be used to carry out these processing. Besides, when the silicon substrate is used, the structure of the pressure sensor is complicated, making it disadvantageously impossible to manufacture a highly reliable, inexpensive pressure sensor.

This invention has been achieved solve the above-explained conventional disadvantages. It is an object of this invention to provide a simple thermal pressure sensor. The thermal pressure sensor thermally detects the displacement quantity of a diaphragm which receives pressure and measures a change in calorie following the deformation of the diaphragm and deprived of from the heating element of a detector or a section heated by the heating element which is away from the diaphragm by a fixed distance.

According to this invention, it is possible to manufacture measurement target elements on a silicon substrate in block in large quantities using a manufacturing technique and a manufacturing apparatus which are conventionally adapted to the silicon substrate. A metallic diaphragm provided on a cylinder is used as a pressure receiving member. It is an object of this invention to obtain a highly reliable, inexpensive pressure sensor which is not required to process the metallic diaphragm and provide a different chamber in which a buffer is held because an external force does not directly act on the measurement target element during pressure measurement.

DISCLOSURE OF THE INVENTION

According to one aspect of the invention, there is provided a pressure sensor comprising a diaphragm structure having at least one diaphragm, the diaphragm having first and second surfaces, the first surface of the diaphragm receiving pressure, a first thermal detection unit having a heating unit and arranged to be opposed to a central section of the second surface of the diaphragm, the first thermal detection unit detecting an amount of displacement of the diaphragm caused by a pressure change based on thermal detection, a first constant-current source which supplies a constant-current to the first thermal detection unit, a second thermal detection unit having a heating unit, wherein the second thermal detection unit positioned near and opposite to a periphery of the second surface of the diaphragm, the second thermal detection unit detecting an amount of displacement of the diaphragm caused by a pressure change based on thermal detection, a second constant-current source which supplies a constant-current to the second thermal detection unit, and a differential amplifier which receives the result of detections by the first thermal detection unit and the second thermal detection unit. The pressure sensor of the present invention is constituted so that the two thermal detection sections thermally detect the displacement quantity of the diaphragm due to pressure change as explained above. It is, therefore, unnecessary to subject a diaphragm surface which receives the pressure to processing such as film formation and photo-engraving. Thus, it is possible to manufacture the principal parts of a thermal pressure detector in block and in large quantities on a silicon substrate at simple manufacturing steps, to improve the accuracy and reliability of the thermal pressure detector, and to obtain an inexpensive pressure sensor. In addition, the pressure is thermally measured in a non-contact manner. Therefore, an external force does not directly act on the thermal pressure detector during measurement. It is unnecessary to secure sufficient bonding strength to resist the pressure of a measurement target fluid between a cylinder and the thermal pressure detector. It is possible to be of a simple structure and to obtain an inexpensive pressure sensor. Furthermore, since the second thermal detection section which is arranged to be opposed to the end section of the second surface of the diaphragm is provided, that is, since the second thermal detection section is provided outside of the diaphragm which has no displacement due to pressure, constant-current sources are connected to the first thermal detection section and the second thermal detection section, respectively and the difference between the signal output and the reference output is obtained so that a pressure signal output and a reference output which does not change according to the pressure can be obtained. It is, therefore, possible to remove a noise component in the same phase or an offset drift component caused by a change in atmospheric temperature, and to obtain an inexpensive, highly reliable pressure sensor.

In addition, the pressure sensor according to the present invention is provided with a circuit which measures the atmospheric temperature and the temperature of the diaphragm from the reference output of the second thermal detection section. It is, therefore, possible to take out a temperature measurement signal without using a special temperature measurement detector.

Moreover, the pressure sensor according to the present invention can remove the drifts of offset and sensitivity according to a change in use environment temperature or the temperature of the diaphragm using the temperature measurement signal from the circuit which measures the atmospheric temperature and the temperature of the diaphragm from the reference output of the second thermal detection section. It is, therefore, possible to obtain a highly reliable pressure sensor.

BEST MODE FOR CARRYING OUT THE INVENTION

The embodiments of this invention will be explained hereinafter with reference to the drawings.

First Embodiment

Figure 1A:
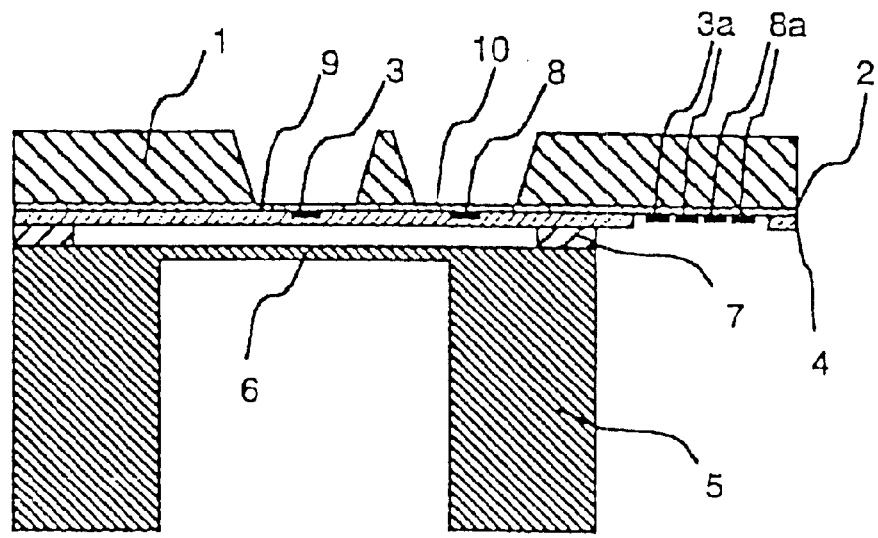
FIG. 1($a$) is a cross-sectional typical view and FIG. 1($b$) is a plan view of a pressure sensor according to a first embodiment of the present invention.
Figure 1B:
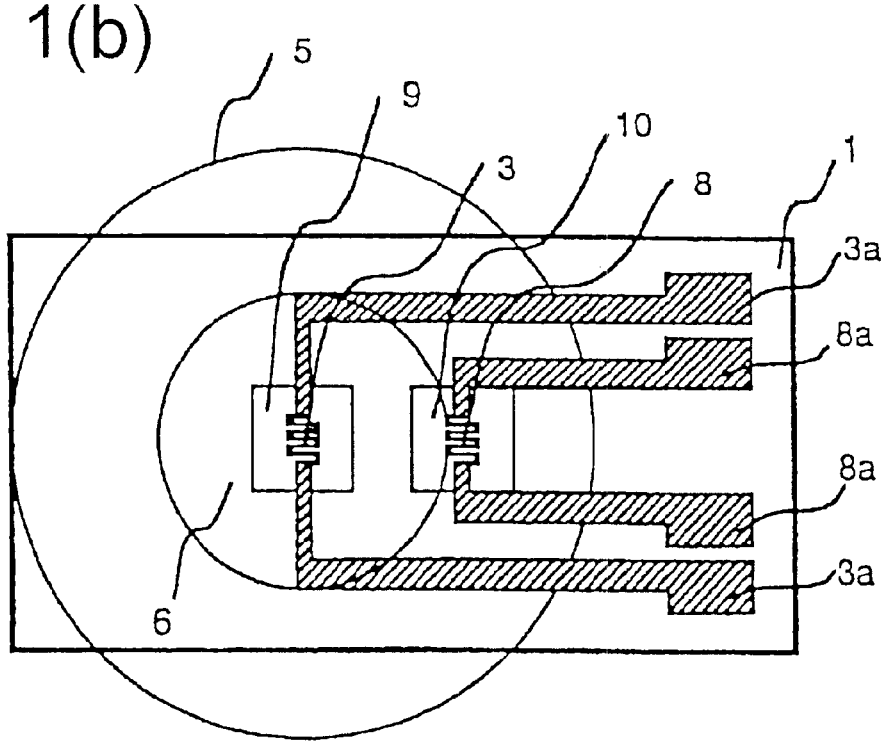
Figure 2:
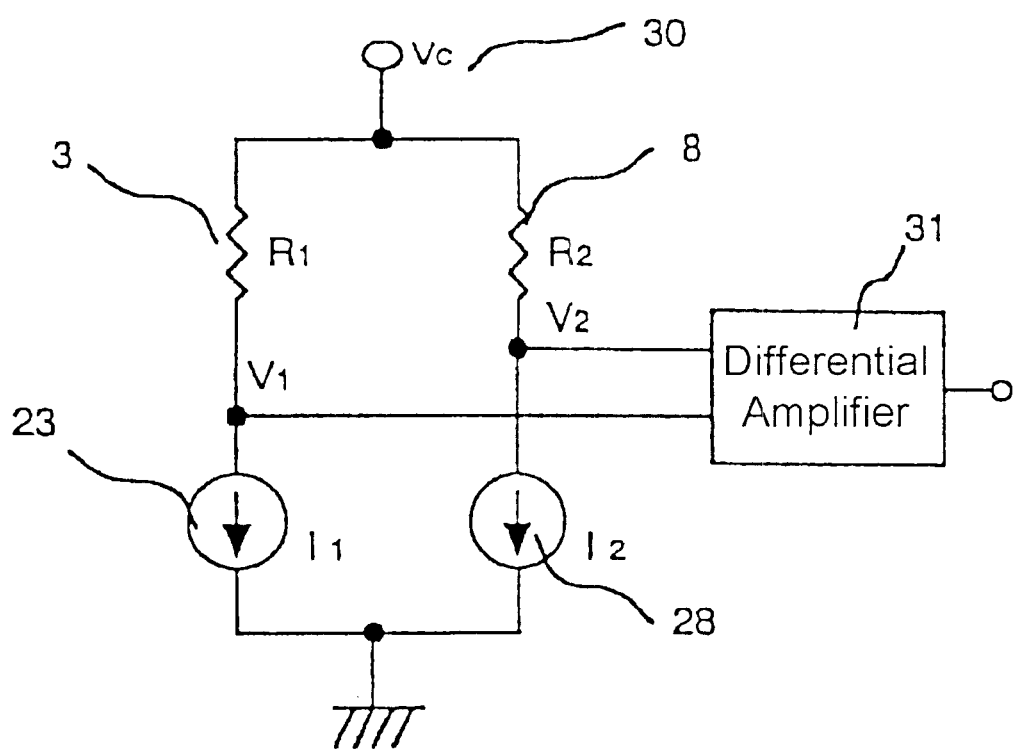
FIG. 2 is a schematic block diagram of a signal read circuit.

FIGS. 1 and 2 are views which explain a pressure sensor according to the present invention. FIGS. 1($a$) is a typical view, FIG. 1($b$) is a plan, typical view, and FIG. 2 is a schematic block diagram of a read circuit.

In FIGS. 1 and 2, reference symbol 1 denotes a flat base material of a thermal sensor which is cut down from, for example, a silicon wafer, 5 denotes a cylinder of, for example, SUS and a diaphragm 6 which receives pressure is formed. Reference symbol 2 denotes an insulating support film which is formed on one surface of the flat base material 1 and which is made of, for example, a silicon nitride film. A thermo-sensitive resistor film 3 (also referred to as a platinum film or current paths hereafter) is formed thereon. This thermosensitive resistor film corresponds to a heat emitting section which is used for heating resistance, temperature measurement resistance and relative resistance, which is made of, for example, platinum. In addition, a second thermo-sensitive resistor film 8 for reference output is formed. The thermo-sensitive resistor film 3 is arranged to be opposite to the center of the diaphragm 6 whereas the second thermo-sensitive resistor film 8 is arranged to be opposite to the end section of the diaphragm 6 which section has a no displacement relative to pressure. A protection film 4 is formed to cover the thermo-sensitive resistor films 3 and 8. Further, the silicon base material 1 around the thermo-sensitive resistor films 3 and 8 is removed and diaphragms 9 and 10 consisting of silicon nitride films 2 and 4 are formed so that heat generated in the thermo-sensitive resistor films 3 and 8 does not escape to the silicon base material 1 but flows in the SUS diaphragm 6 and the SUS cylinder 5 to be thereby efficiently utilized. Further, a spacer 7 is provided so that the diaphragm 6 is arranged to be opposite to the measurement sections of the thermo-sensitive resistor films 3 and 8 and away therefrom by a predetermined distance. Reference symbols 3a and 8a denote pad sections (wiring takeoffs) of the thermo-sensitive resistor films 3 and 8, respectively.

A method of manufacturing principle parts of the pressure detector shown in FIG. 1 will next be explained. A silicon nitride film having a thickness of, for example, 1 $\mu$m is formed on a silicon wafer 1 which has a thickness of about 400 $\mu$m and which serves as the flat base material by a method such as a sputtering method, and the thermo-sensitive resistor film 3 which is made of platinum or the like and which has a thickness of, for example, 0.2 $\mu$m is formed thereon by a deposition method, the sputtering method or the like. Annealing is then performed for few hours at about 600° C. for stabilization. This platinum film 3 is patterned by using a photo-engraving method, a wet etching method, a dry etching method or the like. As a result, current paths 3 and 8 having a pattern as shown in, for example, FIG. 1(b) are formed. A silicon nitride film which has a thickness of about 0.8 $\mu$m and which serves as the protection film 4, is formed on the platinum films 3, 8 and the silicon nitride film 2 by the sputtering method or the like. After forming the surface protection film 4, a spacer is formed. When the spacer is to be of an organic insulating film such as polyimide resin, it is formed by, for example, the following manner. The surface protection film 4 is formed first and a polyimide coating agent is then uniformly applied on the silicon substrate by a method such as spin-coating. A photosensitive resist is then applied and the polyimide resin is processed in a desired pattern by the photo-engraving technique. When a photosensitive polyimide coating agent is used, the pattern can be directly formed without using the resist, making the formation simpler. After being pattern processed, it is baked and solidified at about 300° C. to be polyimide resin. In this way, when the polyimide coating agent is used, the spacer can be accurately formed by a simple process. Finally, desired patterning is conducted to the surface of the flat base material 1 opposite to the surface on which the support film 2 is arranged, by the photo-engraving or the like and then is subjected to, for example, alkali etching. By doing so, a part of the flat base material 1 around the thermo-sensitive resistors 3 and 8 is removed, the diaphragms 9 and 10 consisting of the silicon nitride films 2 and 4 are formed. As can be seen, the pressure detector section of the pressure sensor of the present invention is formed on the silicon substrate using a so-called silicon technology as well as the film formation and photo-engraving technique. The detector section is not directly formed in the diaphragm 6 provided at the cylinder 5 and the pressure detector section and the cylinder 6 are connected to each other through the spacer. The following advantage can be, therefore, obtained. That is, thermal pressure detectors manufactured in block in large quantities on the silicon substrate are high in reliability and easily obtained at low cost. Furthermore, since no external force acts on the thermal pressure detector during the pressure measurement, high bonding strength is not required between the thermal pressure detector and the diaphragm, making it possible to be of a simple pressure sensor structure A read circuit and the operation thereof will next be explained with reference to FIGS. 1 and 2. In FIG. 2, a current is carried to the pressure measurement thermo-sensitive resistor (resistance R1) 3 and the reference output thermo-sensitive resistor (resistance R2) 8 from an external power supply Vc 30, and they are connected to constant-current sources 23 and 28, applied with constant currents and emit heat, respectively. A pressure signal voltage V1 and a reference output voltage V2 are generated in the connection sections of the constant-current sources 23 and 28, respectively. A differential amplifier 31 which obtains the difference between the pressure signal voltage V1 and the reference output voltage V2 and amplifies the difference, is connected. When the interior of the cylinder 5 receives pressure P from a fluid, the diaphragm 6 is displaced and approaches the thermo-sensitive resistor 3, increasing heat flow to the diaphragm 6. As a result, the temperature of the pressure measurement thermo-sensitive resistor 3 decreases, the resistance R1 thereof decreases and the pressure signal voltage V1 increases. On the other hand, since the reference output thermo-sensitive resistor 8 is formed at a position on the outside of the diaphragm 6 which position has a no displacement by-the pressure, even when the pressure is applied, the resistance R2 has no change. Namely, the reference output voltage V2 has no change. The resistance R1 also changes according to an atmospheric temperature. Therefore, when the atmospheric temperature changes, the pressure signal voltage V1 changes greatly. However, if the thermo-sensitive resistor 3 for pressure measurement and the thermo-sensitive resistor 8 for reference output are designed to have the same structure and the same resistance, the resistances R1 and R2 show the same temperature dependency. Therefore, when the differential amplifier which obtains the difference between the pressure signal voltage V1 and the reference output voltage V2 and amplifies is used, it is possible to remove an offset component which greatly changes according to temperature and to amplify and read a pressure signal component.

Often, the resistances R1 and R2 and thermal resistances of the thermo-sensitive resistors 3 and 8 are not completely consistent to one another because of manufacturing irregularity and a difference in arrangement positions thereof. When the differences in resistance and thermal resistance are large between the thermo-sensitive resistor 3 and thermo-sensitive resistor 8, an offset component cannot be completely removed even by obtaining the difference between the pressure signal voltage V1 and the reference output voltage V2. As a result, the sensitivity and offset at zero pressure largely change according to atmospheric temperature. According to the configuration of FIG. 2, even when there are differences in resistance and thermal resistance, it is possible to correct the unbalances thereof by individually adjusting the values of the constant-current source 23 and the constant-current source 28. It is possible to input a pressure signal output and a reference output, balance adjusted, to the differential amplification circuit, to decrease changes in sensor sensitivity and offset according to a change in atmospheric-temperature, and to obtain an accurate pressure signal output without depending on the atmospheric temperature.

In this embodiment, such when the thermo-sensitive resistors 3 and 8 are at the power supply Vc 30 side and the constant-current sources 23 and 28 are at the GND side has been explained. However, even when the both are connected in a vertically reversed manner in the drawing, i.e., the constant-current sources 23 and 28 are at the power supply Vc 30 side and the thermo-resistors 3 and 8 are at the GND side, the same advantage can be obtained.

Second Embodiment

Figure 3:
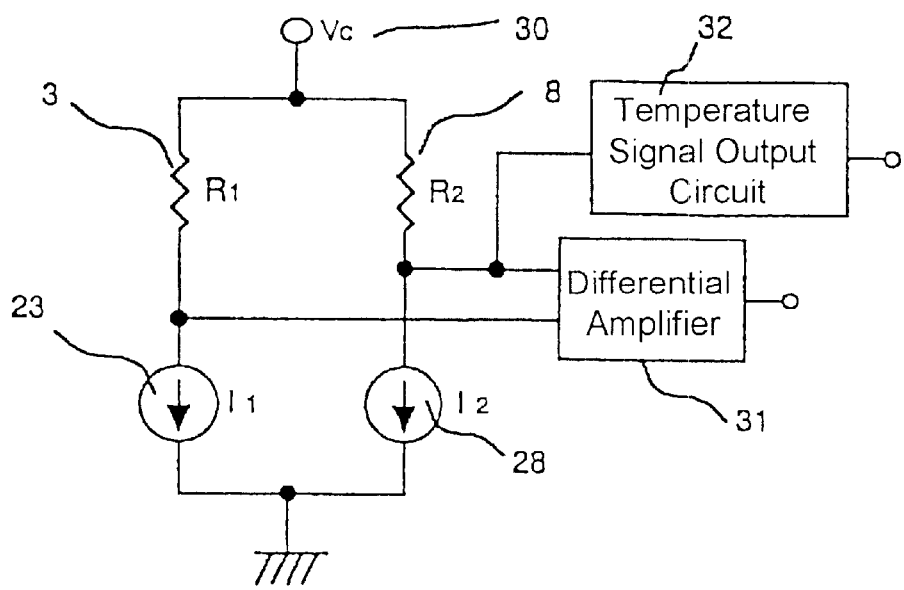
FIG. 3 is a schematic block diagram of a signal read circuit of a pressure sensor according to a second embodiment of the present invention.

Another embodiment of the present invention will be explained hereinafter with reference to the drawing. FIG. 3 shows a read circuit constitution of a pressure sensor according to a second embodiment of the present invention. In FIG. 3, the structure of the sensor and the principal constituent elements of the read circuit constitution are the same as those explained in FIGS. 1 and 2 of the first embodiment. In FIG. 3, a temperature signal output circuit 32 is connected to a reference output terminal. As explained in the first embodiment, the reference output does not depend on applied pressure but changes according to atmospheric temperature. That is, a reference output voltage V2 is expressed by a function of atmospheric temperature T. Therefore, it is possible to -measure the atmospheric temperature T using the reference output voltage V2. When the temperature signal output circuit 32 which outputs a temperature signal from the reference output voltage is used as shown in FIG. 3, it is possible to measure the atmospheric temperature of the pressure sensor without using a dedicated temperature detector to measure the atmospheric temperature.

Third-Embodiment

Figure 4:
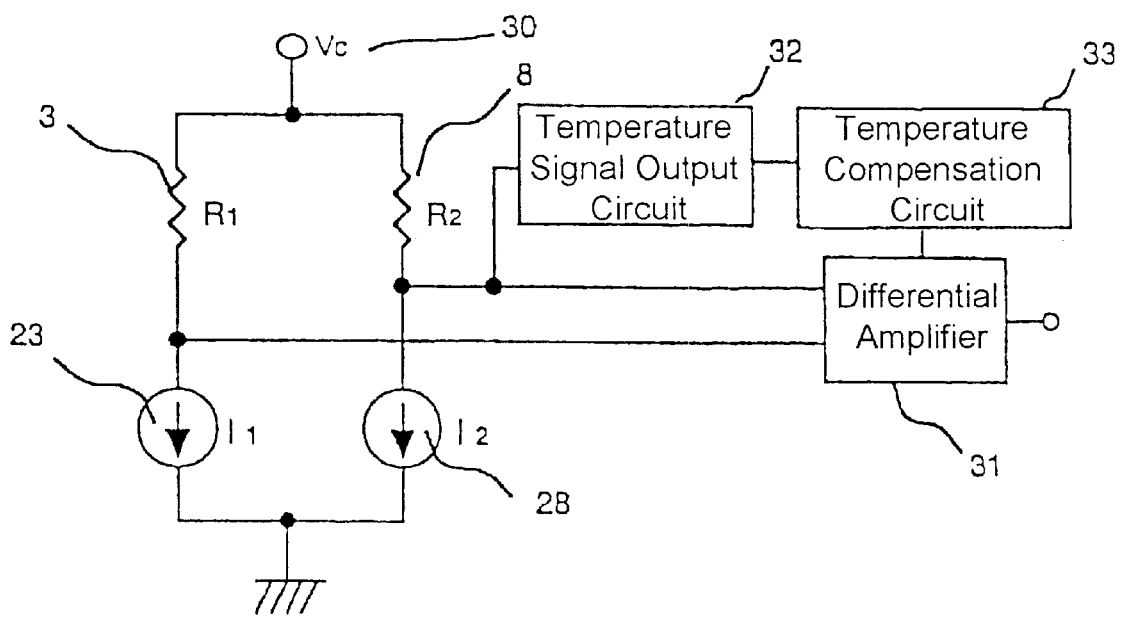
FIG. 4 is a schematic block diagram of a signal read circuit of a pressure sensor according to a third embodiment of the present invention.
Figure 5:
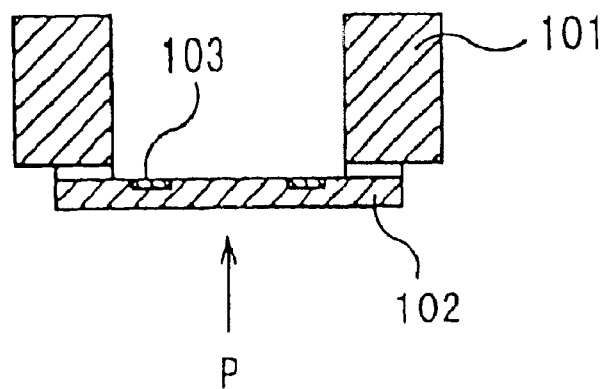
FIG. 5 is a cross-sectional view of a conventional pressure sensor which uses a silicon substrate for a pressure receiving surface and which has a distortion gauge on the silicon substrate.
Figure 6:
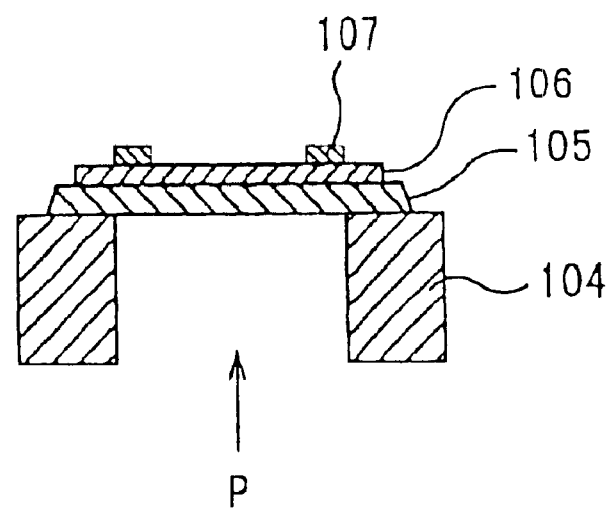
FIG. 6 is a cross-sectional view of a conventional pressure sensor which has a distortion gauge on a pressure receiving surface.
Figure 7A:
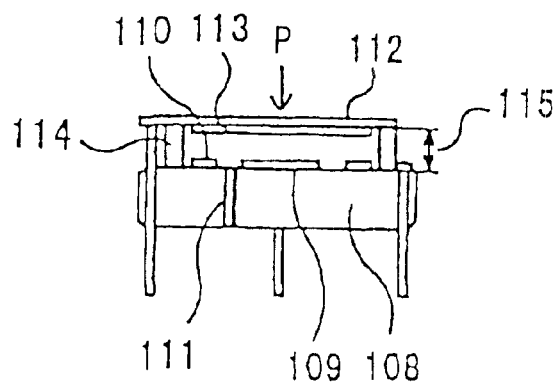
FIGS. 7($a$)–7($c$) show different views of a conventional capacitance pressure sensor.
Figure 7B:
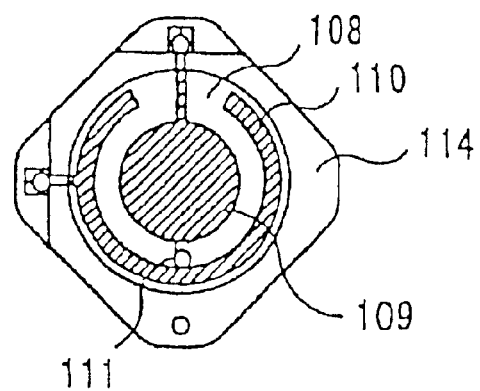
Figure 7C:
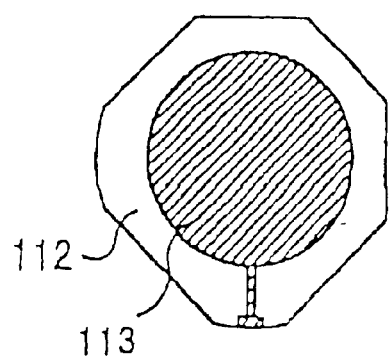

Another embodiment of the present invention will be explained hereinafter with reference to the drawing. FIG. 4 shows a read circuit constitution of a pressure sensor according to the third embodiment of the present invention. In FIG. 4, the structure of the sensor and the principal constituent elements of the read circuit are the same as those explained in FIGS. 1 and 2 of the first embodiment and in FIG. 3 of the second embodiment. In FIG. 4, the output of a temperature signal output circuit connected to a reference output terminal is connected to a temperature compensation circuit 33. As explained in the second embodiment, the temperature signal which depends on the atmospheric temperature T can be output from the temperature signal output circuit using the reference output voltage V2. In this embodiment, using this atmospheric temperature output signal, the dependency of the output of the pressure sensor on the atmospheric temperature can be compensated. Although it is possible to decrease changes in sensitivity and offset according to a change in atmospheric temperature by balance adjusting the constant-current sources, these cannot be made to zero completely. It is possible to maintain a balance between the pressure signal voltage V1 and the reference output voltage V2 at a certain atmospheric temperature so that they are equal at, for example, zero pressure. However, when the resistances and thermal resistances of the thermo-sensitive resistor 3 and the thermo-sensitive resistor 8 greatly differ and the atmospheric temperature changes, then the balance is disturbed and outputs at zero pressure change. In addition, as for sensitivity, since the resistance and thermal resistance depend on temperature, they change according to the atmospheric temperature in principle even when the resistances and thermal resistances do not differ. It is, therefore, necessary to carry out temperature compensation which measures the atmospheric temperature and corrects it so as to accurately measure pressure. It is possible to input a temperature signal from a dedicated temperature detector which measures the atmospheric temperature to the compensation circuit to allow the temperature compensation. However, when it is done so, the characteristics, such as thermal time constant, of the dedicated temperature detector and the thermo-sensitive resistors cannot be made completely consistent, and accurate correction cannot be ensured. In this embodiment, since the thermo-sensitive resistors measure temperature for themselves, the characteristics such as thermal time constant become completely consistent, making it possible to ensure accurate correction and to obtain an accurate pressure signal output which does not depend on the atmospheric temperature.

INDUSTRIAL APPLICABILITY

The pressure sensor according to this invention is a pressure sensor for, for example, a detection of the oil pressure of a vehicle brake, a detection of fuel pressure for engine control, a detection of oil pressure for transmission, a detection of the coolant pressure of an air conditioner and that of a refrigerator.

What is claimed is:

1. A pressure sensor comprising:
   a diaphragm structure having at least one diaphragm, the diaphragm having first and second surfaces, the first surface of the diaphragm receiving pressure;
   a first thermal detection unit having a heating unit and arranged opposed to a central section of the second surface of the diaphragm, the first thermal detection unit detecting amount of displacement of the diaphragm caused by a pressure change, based on thermal detection;
   a first constant-current source which supplies a constant-current to the first thermal detection unit;
   a second thermal detection unit having a heating unit, wherein the second thermal detection unit is positioned near and opposite a periphery of the second surface of the diaphragm, the second thermal detection unit detecting amount of displacement of the diaphragm caused by a pressure change, based on thermal detection;
   a second constant-current source which supplies a constant-current to the second thermal detection unit; and
   a differential amplifier which receives the displacements detected by the first thermal detection unit and the second thermal detection unit.

2. The pressure sensor according to claim 1, comprising a temperature signal output circuit which receives a voltage at a node of the second thermal detection unit and the second constant-current source and outputs a signal dependent on temperature of the second thermal detection section.

3. The pressure sensor according to claim 2, comprising a temperature compensation circuit providing temperature compensation using an output of the temperature signal output circuit.

* * * * *